United States Patent [19]

Wells

[11] Patent Number: 4,844,797

[45] Date of Patent: Jul. 4, 1989

[54] VACUUM EXTRACTION SYSTEM

[75] Inventor: Samuel L. Wells, Lilburn, Ga.

[73] Assignee: S&ME, Incorporated, Raleigh, N.C.

[21] Appl. No.: 171,773

[22] Filed: Mar. 22, 1988

[51] Int. Cl.$^4$ .............................................. E21B 43/38
[52] U.S. Cl. .................................... 210/104; 166/105;
 210/115; 210/117; 210/138; 210/242.3; 417/12
[58] Field of Search .................... 166/68, 105; 417/12,
 417/36, 40; 210/104, 109, 115, 117, 121, 136,
 138, 242.3

[56] References Cited

U.S. PATENT DOCUMENTS

| | | |
|---|---|---|
| 129,353 | 7/1972 | Lytle . |
| 751,323 | 2/1904 | Moran et al. . |
| 801,981 | 10/1905 | Gosse . |
| 964,693 | 7/1910 | Richardson . |
| 984,329 | 2/1911 | Weber . |
| 1,437,939 | 12/1922 | Green . |
| 1,724,858 | 8/1929 | Small . |
| 2,171,402 | 8/1939 | Muir . |
| 2,242,166 | 5/1941 | Bennett . |
| 2,580,332 | 12/1951 | Teetor . |
| 2,630,178 | 3/1953 | Brown . |
| 2,777,399 | 1/1957 | Clark, Jr. . |
| 3,071,189 | 1/1963 | Colvin et al. . |
| 3,092,143 | 6/1963 | Denman . |
| 3,288,081 | 11/1966 | McMillan . |
| 3,289,691 | 12/1966 | Kennard . |
| 3,425,555 | 2/1969 | Ridgeway . |
| 3,617,152 | 11/1971 | Cummings . |
| 3,628,607 | 12/1971 | Dietz . |
| 3,647,319 | 3/1972 | McLean et al. . |
| 3,894,583 | 7/1975 | Morgan . |
| 3,901,811 | 8/1975 | Finch . |
| 3,931,831 | 1/1976 | French . |
| 3,991,825 | 10/1976 | Morgan . |
| 4,025,237 | 5/1977 | French . |
| 4,187,912 | 2/1980 | Cramer . |
| 4,222,440 | 9/1980 | Parker . |
| 4,237,650 | 6/1981 | Solomon . |
| 4,252,649 | 2/1981 | Favret, Jr. . |
| 4,273,650 | 6/1981 | Solomon .............................. 210/104 |
| 4,295,975 | 10/1981 | Walin . |
| 4,435,292 | 3/1984 | Kirk et al. . |
| 4,466,777 | 8/1984 | Kimberlin .............................. 417/12 |
| 4,469,170 | 9/1984 | Farmer .............................. 210/104 X |
| 4,489,779 | 12/1984 | Dickinson et al. . |
| 4,497,370 | 2/1985 | Breslin . |
| 4,527,633 | 7/1985 | McLaughlin et al. . |
| 4,546,830 | 10/1985 | McLaughlin et al. . |
| 4,625,801 | 12/1986 | McLaughlin et al. . |
| 4,678,040 | 7/1987 | McLaughlin et al. . |
| 4,746,423 | 5/1988 | Moyer .............................. 210/104 |
| 4,747,451 | 5/1988 | Adams et al. .............................. 417/36 X |
| 4,781,536 | 11/1988 | Hicks .............................. 417/12 |

FOREIGN PATENT DOCUMENTS 1367088 6/1964 France .

OTHER PUBLICATIONS

Ejector Systems, Inc. brochure (no date), published by Ejector Systems, Inc., 921 National Avenue, Addison, Illinois 60101.

Pump Engineer Associates, Inc. brochure (1983), published by Pump Engineer Associates, Inc., 921 National Avenue, Addison, Illinois 60101.

Primary Examiner—Charles Hart
Attorney, Agent, or Firm—G. H. Telfer

[57] ABSTRACT

There is disclosed a vacuum extraction system in which one or more vacuum extraction vessels are suspended in one or more well bores and each is connected to a vacuum pump. In one embodiment, each extraction vessel has a vessel chamber, a top inlet port with an adjustable metering valve, a vent pipe, a liquid level sensor in the vessel chamber, and an outlet port connected to the vacuum pump through a controller. The controller responds to the level of liquid in the vessel chamber to connect and disconnect each of the outlet ports of each of the extraction vessels to and from the vacuum pump. The controller also activates and deactivates the vacuum pump. In another embodiment, the extraction vessel is suspended for reciprocation in the well bore in order to skim liquid hydrocarbons floating on the ground water. In another embodiment, the extraction vessel has a differentiation valve in its bottom which releases water, but not liquid hydrocarbons, when the extraction vessel is lifted free of the liquid in the well.

16 Claims, 12 Drawing Sheets

VACUUM EXTRACTION SYSTEM

BACKGROUND OF THE INVENTION

This invention relates generally to vacuum extraction systems for recovering liquid hydrocarbons from ground water, and more particularly concerns a vacuum extraction system which removes all of the liquid hydrocarbons from a well bore and which provides control of the flow of liquid from each well within a multiple well field to assure equilibrium among the wells being serviced by the vacuum extraction system.

At petroleum handling facilities such as refineries, storage facilities, terminal facilities, and gasoline stations, spillage of liquid hydrocarbons can result in the contamination of ground water in the immediate vicinity. The problem of ground water contamination can occur as a result of slow leakage over time or a more catastrophic spillage event. In either case, the liquid hydrocarbons seep through the ground to the level of the ground water table. Because liquid hydrocarbons have specific gravities that are less than water and are generally immiscible with water, they form a layer on top of the ground water table.

Conventionally, in order to remove the contaminating liquid hydrocarbons from the ground water, it has been necessary to drill a number of bore holes or drive a number of well points in the area where the contamination exists and then extract large quantities of ground water to create a cone of depression in the ground water table adjacent each of the well bores or well points. Gravity forces the liquid hydrocarbons to flow toward the center of the cones of depression, and the liquid hydrocarbons collect there within each well bore or well point. In some areas where the ground water table level is shallow, it may be possible to adopt a vacuum extraction system for servicing the wells. A vacuum extraction system is limited in the depth from which it can draw water and liquid hydrocarbons to the surface. As a practical matter, with losses in the system, vacuum extraction systems are generally limited to about 20 to 25 feet of depth.

A conventional vacuum extraction system consists of well points driven into the ground to a predetermined depth. The outlet port of each well point is then connected through a restrictor to a vacuum manifold. As the extraction progressed, the restrictors are adjusted to assure that none of the well points in the system is pulling air into the manifold. The adjustment is typically done by means of a stethoscope pressed to the outlet port adjacent the restrictor by which a technician could listen for the sound of air passing through the outlet port of each individual well point. Such prior vacuum extraction systems are incapable of removing all of the accumulated liquid hydrocarbons once the hydrocarbon layer becomes thin on top of the water table. As the cone of depression around each well point sinks to the level of the intake screen of the well point, and the liquid hydrocarbons begins flowing into the intake, there is a very short distance (the thickness of the liquid hydrocarbon layer) between the entry of the liquid hydrocarbons into the well point and the entry of air at the interface between the liquid hydrocarbons and the air. Consequently, just at the point where the well point begins drawing liquid hydrocarbons, any small drop in the liquid level causes the well point to begin drawing air. When the well point begins drawing air, the technician closes down the restrictor to limit the flow thereby allowing the cone of depression adjacent the well point to rise so that the well point extracts water and not the liquid hydrocarbons as intended. Moreover, the presence of the restrictor at the outlet of the well point adjacent the vacuum manifold assures that any liquid hydrocarbons that are extracted by the well point are thoroughly emulsified as they pass through the restrictor thus rendering separation and recovery expensive if not nearly impossible. For well points that are driven too deep, those particular well points may draw water and no liquid hydrocarbons throughout the entire extraction process. Also, there is no way of raising or lowering the well point to compensate for the depth of the water, liquid hydrocarbon, and air interface even if the depth of that interface depth could be determined through use of the well point, which it cannot.

SUMMARY OF THE INVENTION

It is therefore an object of the present invention to provide a vacuum extraction system in which the level of the water and liquid hydrocarbon interface in a well bore can be determined, an extraction vessel in the well bore can intake the liquid hydrocarbons at the interface, and the liquid hydrocarbons can be completely and continuously removed from the well bore because the liquid hydrocarbons float on the water and weir into the top of the extraction vessel.

It is also an object of the present invention to provide a vacuum extraction system in which all of the extraction vessels in a multiple well field are connected to a single vacuum manifold but in which each extraction vessel's maximum extraction rate can be individually controlled to assure efficiency of extraction throughout the field.

It is a futher object of the present invention to provide a vacuum extraction system in which the extraction vessel reciprocates within the well bore to skim the floating liquid hydrocarbons from the underlying ground water.

It is likewise an object of the present invention to provide a vacuum extraction system in which the extraction vessel reciprocates within the well bore to skim the floating liquid hydrocarbons from the underlying ground water and to separate and release any ground water that is collected while skimming the floating liquid hydrocarbons.

In order to achieve the foregoing objectives, the vacuum extraction system of the present invention includes an extraction vessel suspended in a well bore which extraction vessel has a vessel chamber with a vacuum outlet port connecting the vessel chamber to a vacuum pump via a vacuum manifold. In addition, the vessel chamber has an intake port with a metering valve. The metering valve can be adjusted for each extraction vessel within each well bore within a multiple well field so that each extraction vessel draws off liquid in the well bore at a predetermined rate. The rate of withdrawal of liquid can then be adjusted to tune the vacuum extraction system to peak efficiency. In addition, each extraction vessel has a vent port on the top which communicates with the atmosphere by means of a pipe extending above the liquid level in the well bore to assure that the liquid flowing into the vessel chamber through the metering valve is only flowing under the influence of gravity and is not being sucked into the extraction vessel by the action of the vacuum at the outlet of the vessel chamber. In order to assure that no extraction vessel in the system is pumped dry, there is provided a controller between the outlet port of the extraction vessel and the vacuum manifold which controller responds to a liquid level sensor within the vessel chamber to connect and disconnect the vacuum outlet port to and from the vacuum manifold.

In another embodiment of the present invention, the liquid level sensor for each extraction vessel for a multiple well field is connected via pneumatic logic circuitry of a pump controller to the vacuum pump so that when all of the wells in the multiple well field have been drawn down sufficiently to disconnect each extraction vessel within each well from the vacuum manifold, the vacuum pump will be shut off in order to save power and increase service life of the vacuum pump.

In a further embodiment, each well is provided with its own vacuum pump which is activated and deactivated in response to the liquid level sensor within the vessel chamber of the extraction pump. Such an embodiment is particularly appropriate to a single well installation.

In another embodiment of the present invention, the metering valve is removed from the intake port of the extraction vessel, and the extraction vessel is suspended from a pneumatic lift cylinder at the top of the well bore. When the liquid in the vessel chamber reaches a predetermined upper filled level as determined by the liquid level sensor, the controller causes the lift cylinder to lift the extraction vessel in the well bore while simultaneously connecting the vacuum pump via the vacuum manifold to the outlet port of the vessel chamber to draw out the liquid accumulated therein. Once sufficient liquid has been withdrawn from the vessel chamber and the liquid level therein has dropped below a predetermined lower level as determined by the liquid level sensor, the controller disconnects the outlet port of the vessel chamber from the vacuum manifold. The controller causes the cylinder to slowly lower the extraction vessel into the liquid in the well bore so that the floating liquid hydrocarbons weir over into the intake port of the vessel chamber thereby collecting all of the liquid hydrocarbons present in the well bore. The reciprocating sequence of the vacuum extraction system serves to skim all of the floating layer of liquid hydrocarbons off of the ground water in the well bore.

In a further embodiment of the present invention, the vacuum extraction system having the lift cylinder as previously described also has a liquid differentiation valve in the bottom of the vessel chamber. The liquid differentiation valve allows water collected in the vessel chamber during the lowering of the extraction vessel to drain out of the bottom of the vessel chamber while the extraction vessel is being raised. The liquid differentiation valve also keeps ground water from flowing back into the bottom of the vessel chamber while the extraction vessel is being lowered into the liquid in the well bore. Once the liquid in the vessel chamber has reached the predetermined filled level as indicated by the liquid level sensor during the lowering of the extraction vessel, the controller causes the cylinder to lift the extraction vessel out of the liquid in the well bore. As the extraction vessel is being lifted, a delay timer in the controller is activated which must time out before the outlet port of the extraction vessel is connected to the vacuum manifold to draw the liquid out of the vessel chamber. The delay time allows any water collected through the top intake port of the extraction vessel to escape through the differentiation valve in the bottom of the vessel chamber. If the release of water through the differentiation valve causes the liquid in the vessel chamber to reach the predetermined lower level before the delay time ends, the lift cylinder will be deactivated by the controller, and the extraction vessel will be lowered again slowly into the liquid to skim off another portion of the floating liquid hydrocarbon. If on the other hand, the liquid level in the vessel chamber does not fall below the predetermined lower level before the delay time expires, the controller will connect the outlet port of the extraction vessel to the vacuum manifold which will draw off the liquid hydrocarbons in the vessel chamber until the liquid hydrocarbons are drawn down to the predetermined lower level in the vessel chamber. Once the liquid level reaches the predetermined lower level in the vessel chamber, the controller will disconnect the outlet port of the extraction vessel from the vacuum manifold, and the lift cylinder will slowly lower the extraction vessel to skim more liquid hydrocarbons.

Other objects and advantages of the invention will become apparent upon reading the following detailed description and upon reference to the drawings.

DETAILED DESCRIPTION OF THE INVENTION

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Figure 1:
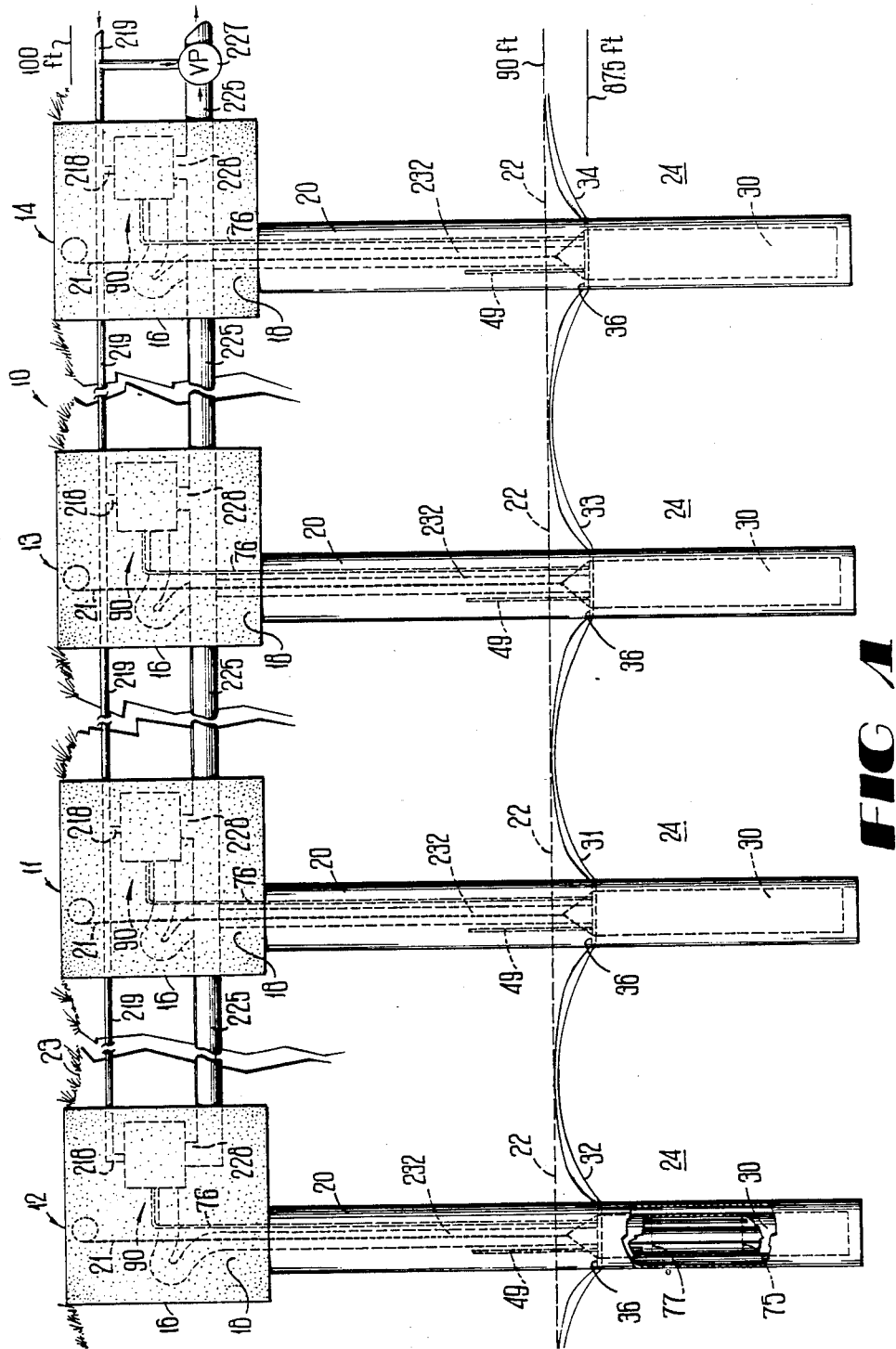
FIG. 1 is a schematic elevation view in cross-section of the vacuum extraction system of the present invention showing multiple wells.

Turning to FIG. 1, there is shown a vacuum extraction system 10 for use in connection with wells 11,12,13, and 14. The wells 11,12,13, and 14 represent just four of what may be one or more wells located around a clean up site in order to extract liquid hydrocarbons in layer 36 that have contaminated the ground water in aquifer 24. A vacuum extraction vessel 30 is suspended by means of cable 21 in each well for collecting and withdrawing the liquid hydrocarons and ground water from the well bores. As a result of the withdrawal of the liquid hydrocarbons and ground water, cones of depression 31, 32, 33, and 34 are created in the static ground water table 22 around each of the wells 11, 12, 13, and 14. The cones of depression 31, 32, 33, and 34 result because the liquids in the wells are drawn to the surface faster than the aquifer 24 can replenish the ground water around the wells. Consequently, in a non-prolific aquifer, a fairly deep cones of depression may be created, whereas in the case of a prolific aquifer, the cones of depression will be relatively shallow at the wells. Each extraction vessel 30 collects liquid in each well, and the collected liquid is withdrawn from each extraction vessel by means of a vacuum pump 227 connected to each extraction vessel via a manifold 225. Because the liquid is withdrawn from the extraction vessel by means of a vacuum pump, the depth of the extraction vessels is limited to about 20 feet or less.

The vacuum pump 227 is driven from a source of compressed air (line 219), but any suitable motive source of energy may be used. The manifold 225 is connected to each extraction vessel 30 via pipes 228, controllers 90, and outlet pipes 232. The source of compressed air is connected to controllers 90 by pipes 218 to power the controllers.

Figure 2:
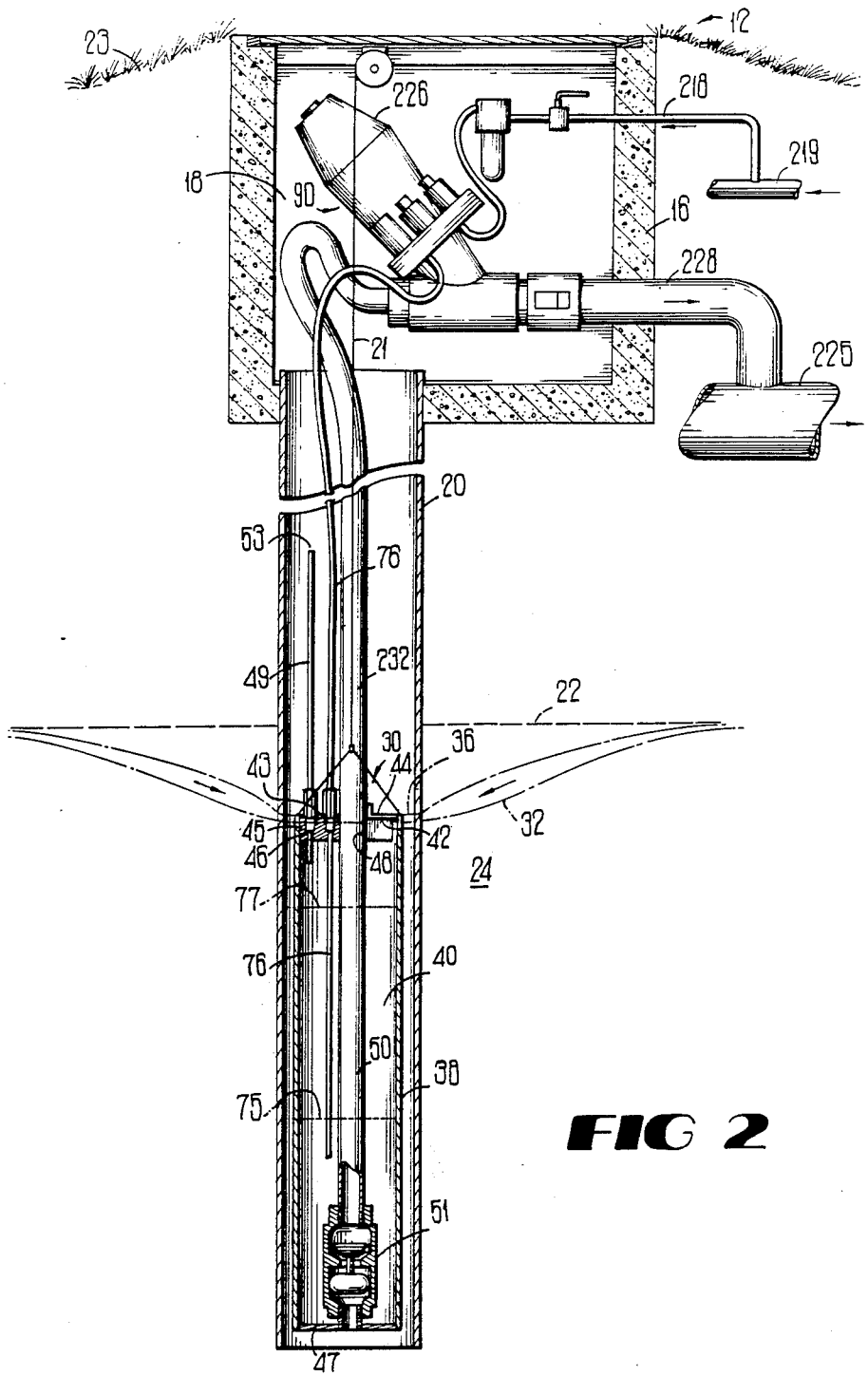
FIG. 2 is an enlarged schematic elevation view in cross-section of the extraction vessel of the vacuum extraction system of FIG. 1.

Turning to FIG. 2, there is shown well 12 which is typical of each of the wells 11, 12, 13, and 14. Each well includes a concrete vault 16 with a compartment 18 in which the various controls for the pump system are housed and protected from the environment. Each well also includes a well casing 20 which is a perforated pipe extending from the surface 23, through the static water table level 22, and into the aquifer 24. The water bearing aquifer 24 below the static water table 22 is soil and/or rock saturated with ground water which is contaminated with liquid hydrocarbons floating in layer 36.

The cone of depression 32 provides a gravitational gradient which will cause the liquid hydrocarbons trapped in the surrounding aquifer to gravitate along the cone of depression to the well casing where they will collect on top of the ground water in the well casing to form the layer 36 of free floating liquid hydrocarbons. Once the cone of depression 32 has been established, it is necessary to draw continuously ground water from the well casing in order to maintain the cone of depression.

With continuing reference to FIG. 2, it can be seen that the extraction vessel 30 is cylindrical in shape with side wall 38, a top plug 45, and a bottom plug 47 which define an enclosed vessel chamber 40. The extraction vessel 30 has a top intake port 42 with a metering valve 44 which may be opened and closed to meter the amount of liquid that enters the vessel chamber 40 through the intake port 42. The extraction vessel 30 has a vacuum outlet port 48 connected to pipe 50 which extends into the vessel chamber 40 to near the bottom plug 47 of the vessel chamber. The pipe 50 has a check valve 51 which precludes liquid from flowing back into the vessel chamber 40 from pipe 50. The outlet port 48 is connected to the vacuum manifold 225 via flexible outlet pipe 232, controller 90, and pipe 228. The extraction vessel 30 has a vent port 46 connected to a pipe 49 which extends above the vent port so that its top opening 53 is above the liquid level in the casing 20. The vent pipe 49 assures that liquid only enters the intake port 42 under the influence of gravity and is not sucked in by the action of the vacuum pump. The extraction vessel 30 also has a sensor pipe 76 which extends into the vessel chamber 40 and is connected through sense port 43 in the top plug 45 to controller 90. The sensor pipe and controller detect when liquid in the vessel chamber has reached a predetermined upper filled level 77 and a predetermined lower level 75.

Figure 3:
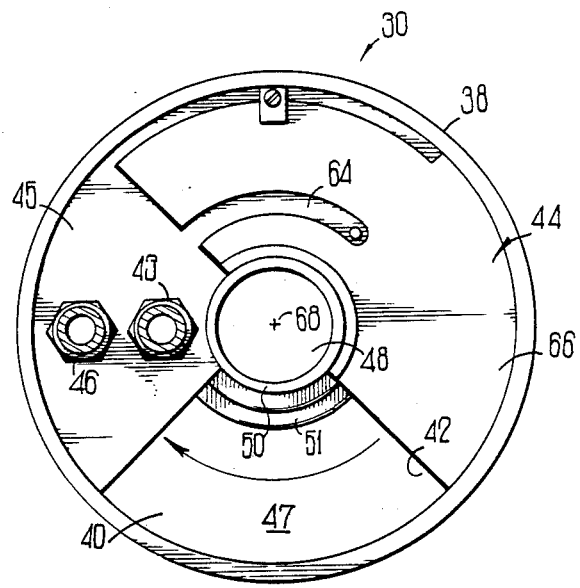
FIG. 3 is a top plan view of the extraction vessel of the vacuum extraction system of FIG. 1.

Turning to FIG. 3, there is shown the intake port 42 with metering valve 44 which is adjustable to restrict the flow of liquid into the top of the vessel chamber 40. Particularly, the metering valve 44 consists of stationary section 64 and a movable section 66 which is rotatable about axis 68 of outlet port 48. By rotating section 66, the cross-sectional area of the port 42 can be increased or decreased to meter the flow of liquid into the vessel chamber 40. Other metering arrangements may be used such as interleaved and adjustable serrated teeth around the top of the vessel chamber, multiple adjustable openings, and the like.

Figure 4:
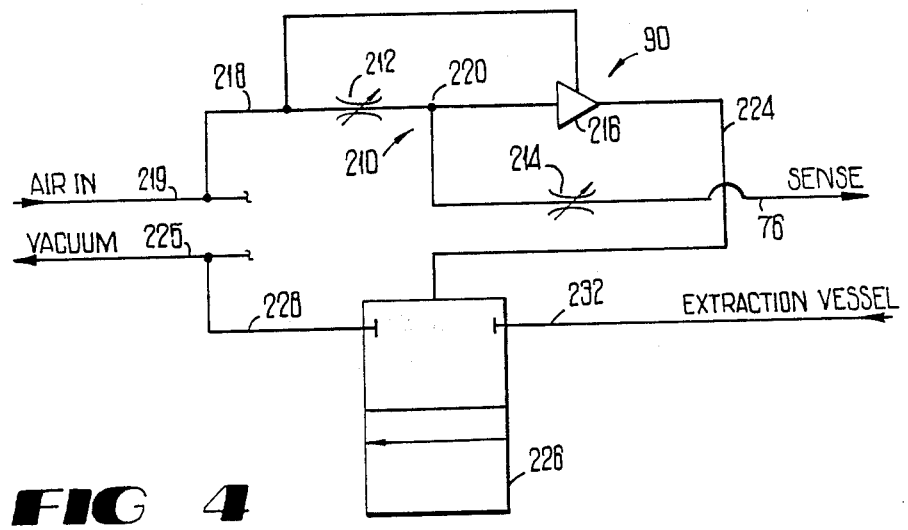
FIG. 4 is a schematic diagram of the air logic controller of the vacuum extraction system of FIG. 1 which controller is used to control the individual extraction vessels.

The operation of the vacuum extraction system 10 is controlled by controller 90 shown schematically in FIG. 4. The controller 90 connects and disconnects the vacuum manifold 225 to and from the outlet pipe 232 of extraction vessel 30 in response to the level of liquid in the vessel chamber 40. The controller is connected to the vacuum manifold 225 by means of vacuum input 228 and to a source of compressed air (line 219) by means of compressed air input 218. Controller 90 includes a sensing circuit 210 consisting of restrictors 212 and 214 and operational amplifier 216. The compressed air input 218 supplies compressed air to the sense circuit 210. The compressed air at input 218 passes through restrictor 212 to the input of operational amplifier 216 and through restrictor 214 to the sensor pipe 76 which terminates in the vessel chamber 40 of the extraction vessel 30 (FIG. 2). As long as the liquid in the vessel chamber 40 has not risen to the upper filled level 77 (FIG. 2) on the sensor pipe 76, the back pressure created in sensor pipe 76 and at node 220 is not sufficient to turn on operational amplifier 216. Once the liquid in the sleeve chamber rises to the predetermined upper filled level 77 in the vessel chamber, the back pressure created in sensor pipe 76 and node 220 is sufficient to turn on amplifier 216.

When the operational amplifier 216 turns on as a result of the liquid in the vessel chamber 40 rising to predetermined upper filled level 77, air pressure is produced at the amplifier's output 224 to drive two way normally closed valve 226 to its on condition which in turn connects vacuum input 228 from manifold 225 to the outlet pipe 232 of extraction vessel 30. The vacuum in the vacuum manifold 225 draws liquid from the vessel chamber 40, through pipe 50, through outlet port 48, through outlet pipe 232, through pipe 228, and into the vacuum manifold 225 until the liquid level in the vessel chamber drops to predetermined lower level 75. At level 75, there is insufficient back pressure in sensor pipe 76 to keep amplifier 216 on. The amplifier 216 then exhausts line 224 to atmosphere, and the vacuum at input line 228 is disconnected by means of two way normally closed valve 226 from vacuum outlet pipe 232 of the extraction vessel 30. The predetermined levels 77 and 75 are established by adjusting restrictors 212 and 214 of controller 90.

Returning to FIG. 1, the vacuum extraction pump system 10 provides a controllable extraction system for a multiple well field. In FIG. 1 an illustrative clean-up field installation has the ground surface 23 at an elevation of 100 feet and a static water table 22 at an elevation of 90 feet. Four recovery wells 11, 12, 13, and 14 are installed, each having a an estimated yield of 10 gallons per minute (total of 40 gpm) which is the separation capacity of the surface separation equipment. From pump testing or computer modeling it has been concluded that after 15 days of pumping, the water table within each recovery well will theoretically be lowered 2.5 feet or depressed to an elevation of 87.5 feet. After 15 days of pumping, three water table conditions are possible:

|   | Condition | Conclusions and Action |
|---|-----------|------------------------|
| 1. | All recovery wells are depressed to 87.5 feet and yield is 40 gpm. | The system is working as planned and needs only to be monitored. |
| 2. | All recovery wells are depressed to 87.5 but yield is less than 40 gpm. | Lower extraction vessels in area of greatest hydrocarbon layer thickness to obtain a system output of 40 gpm or reduce rate of vacuum pump. |
| 3. | Water level in one or more recovery wells is above 87.5 feet and the total yield is 40 gpm. | In those recovery wells in which the water table is not depressed to an elevation of 87.5 feet, adjust elevation of extraction vessel upward to the actual depression depth. |

Figure 5:
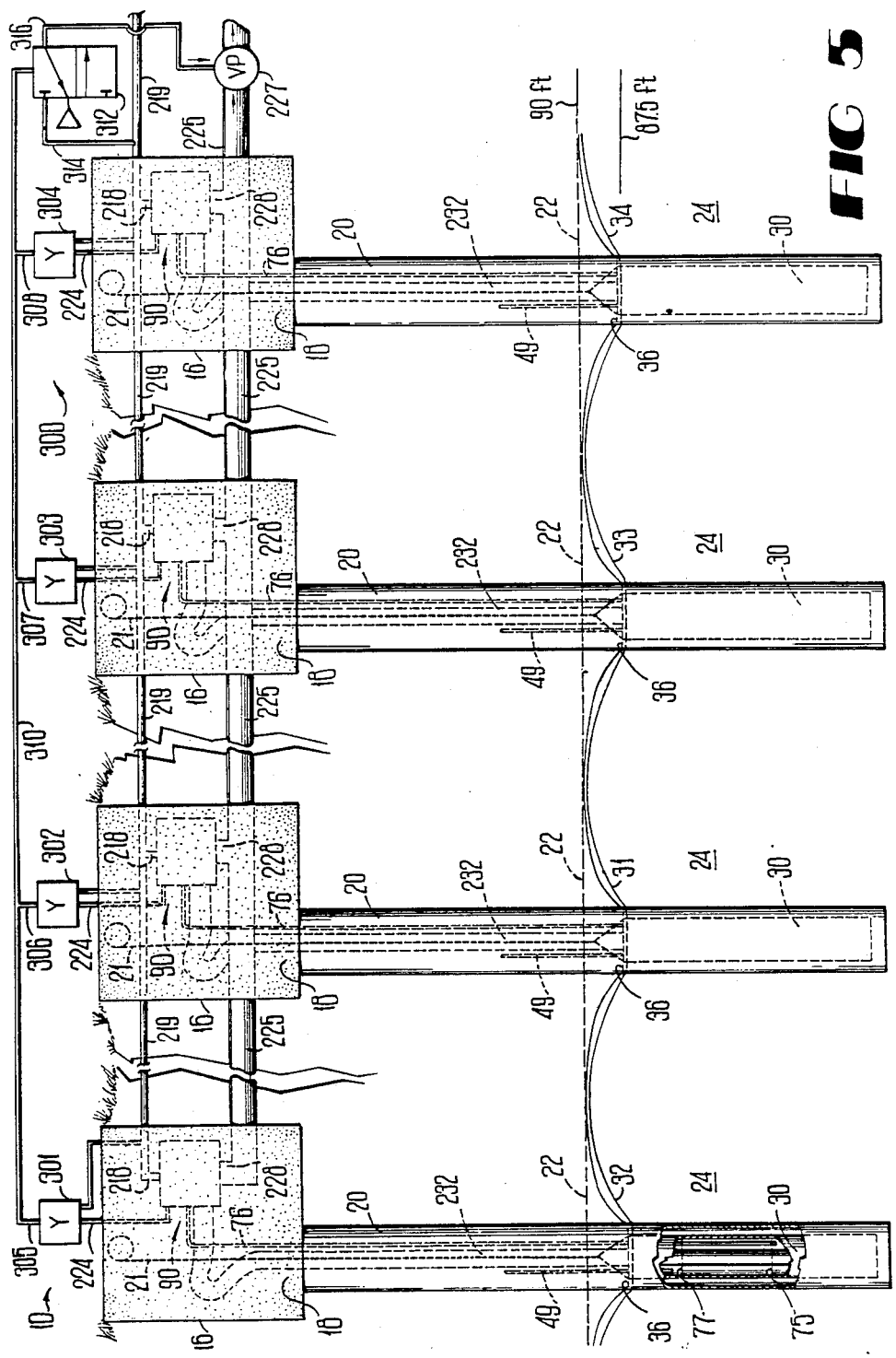
FIG. 5 is a schematic elevation view in cross-section of the vacuum extraction system of FIG. 1 showing another embodiment of the air logic controller used to control the vacuum pump.

Another feature of the present invention in a multiple well field is the ability to concentrate on a specific part of the contaminated field. For example, if after a hundred days of operation, monitoring wells adjacent to recovery wells 11, 12, and 13 (FIG. 1) indicated that no free liquid hydrocarbons remain in those wells, but that liquid hydrocarbons still exist in well 14, a larger cone of depression is needed adjacent well 14 to effect desired recovery. To achieve this result, recovery wells 11, 12, and 13 may be shut down or their flow restricted by the metering valve 44, and the flow in well 14 is increased by adjusting the extraction vessel metering valve 44 and by lowering the extraction vessel. FIG. 5 shows a pump controller 300 which includes additional control circuitry to control the operation of vacuum pump 227 of the vacuum extraction system 10 of FIG. 1. The pump controller 300 determines when all four extraction vessels 30 in wells 11, 12, 13, and 14 have been disconnected from the vacuum manifold 225 and shuts off the vacuum pump 227. In clean up sites where the aquifer is not particularly prolific, there may be substantial periods of time during which liquid hydrocarbons and water are slowly seeping through the cones of depressions into the well bores. During that period of time, the liquid level in the vessel chamber 40 of all of the extraction vessels 30 may be below the upper filled level 77 in the vessel chamber so that the controllers 90 keep all of the extraction vessels 30 disconnected from the vacuum manifold 225. During such a period of disconnection, running the vacuum pump simply wastes energy. Consequently, it is advantageous to deactivate the vacuum pump to save energy.

In order to turn off the vacuum pump 227 when all of the vacuum extraction vessels 30 are disconnected from the vacuum manifold, the controller 300 includes logic "yes" circuits 301, 302, 303, and 304 which are each connected to line 224 from each of the controllers 90 for each well. The "yes" circuits 301, 302, 303, and 304 are each connected to compressed air input 218 which provides isolation between the inputs and outputs of the "yes" circuits. The presence of air pressure on any line 224 from its respective controller 90 indicates that the operational amplifier 216 (FIG. 4) in that controller is on because the liquid has risen to the upper level 77 in the associated extraction vessel. Therefore, when air pressure exists on any of the lines 224 from any of the wells, the associated "yes" circuit 301, 302, 303, or 304 produces an output on its respective output 305, 306, 307, or 308. The "yes" circuit outputs are connected together to a single line 310 which in turn controls a normally closed valve 312. The input 314 of the normally closed valve 312 is connected to the source of compressed air on line 219, and the output 316 of the normally closed valve 312 is connected to and provides motive power to the vacuum pump 227.

Consequently, when all of the inputs to the pump control circuit 300 on lines 224 from the wells are low (no air pressure), the combined output of the logic "yes" circuits on line 310 is low so that the normally closed valve 312 remains closed and power is not supplied to the vacuum pump via line 316. When any one of the lines 224 goes high (presence of air pressure) indicating that the level in any one of the extraction vessels has risen to the upper level 77, the air pressure on that line 224 is connected through the "yes" circuit to the output line 310 which in turn causes normally closed valve 312 to connect the compressed air from line 219 to the vacuum pump 227 and to activate the vacuum pump.

Figure 6:
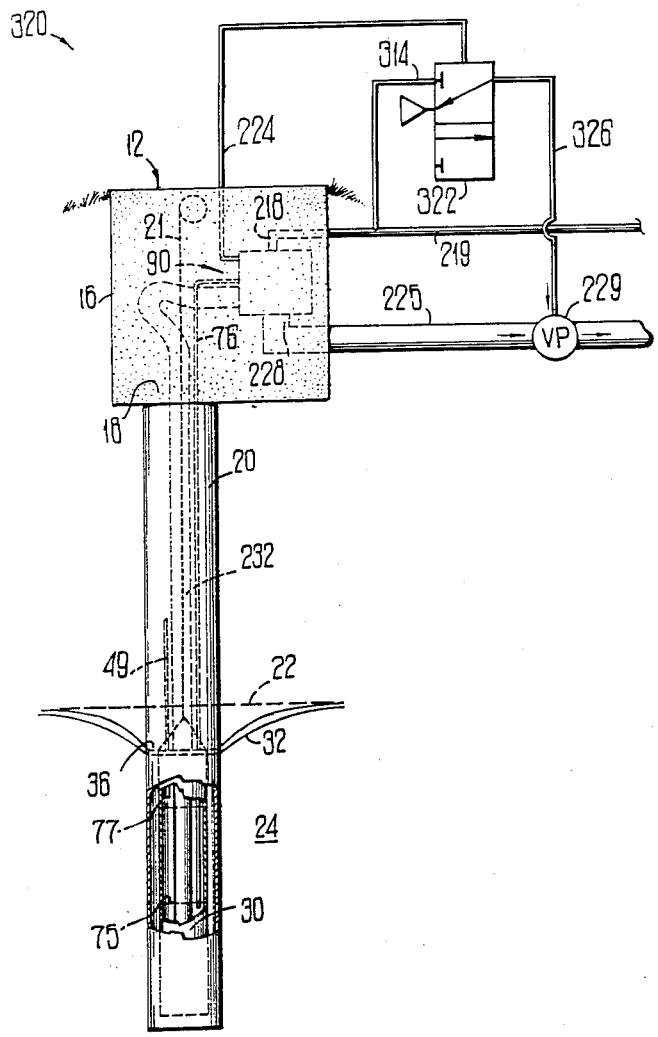
FIG. 6 is a schematic diagram of a second embodiment of the vacuum extraction system of the present invention showing an air logic controller used to control the vacuum pump for a single well vacuum extraction system.

FIG. 6 shows a vacuum extraction system 320 for a single well such as well 12 (FIGS. 1-5). Consequently, the same reference numerals used in FIGS. 1-5 will identify similar parts in FIG. 6. The vacuum extraction system 320 shown in FIG. 6 is similar to that shown in FIG. 5 except that a vacuum pump 229 (instead of vacuum pump 227) is located at each well head, and a vacuum manifold 223 services the single well 12. The vacuum pump 229 is controlled by normally closed valve 322 in response to a signal on line 224 of controller 90 (except that two way valve 226 in FIG. 4 may be deleted and lines 228 and 232 may then be connected together) from well 12. Again, as previously described, when the liquid level in the extraction vessel 30 in well 12 reaches the predetermined upper level 77, air pressure appears on line 224 which causes normally closed valve 322 to connect compressed air on line 219 to the vacuum pump 229 via line 326.

Alternatively, the vacuum extraction system 320 shown in FIG. 6 could be adopted to a multiple well field in which each well has its own vacuum pump 229, and the wells are all connected together via a single compressed air line 219 which supplies compressed air to drive the vacuum pump 229 and controller 90. Such a multiple well system using a number of vacuum extraction systems 320 each with its own vacuum pump 229 allows flexibility in setting up a clean up installation. Clean up could begin with a single well and later as required expand to additional wells without either having a vacuum pump that is too large to begin with or too small once additional wells have been added to the clean up site.

Figure 7:
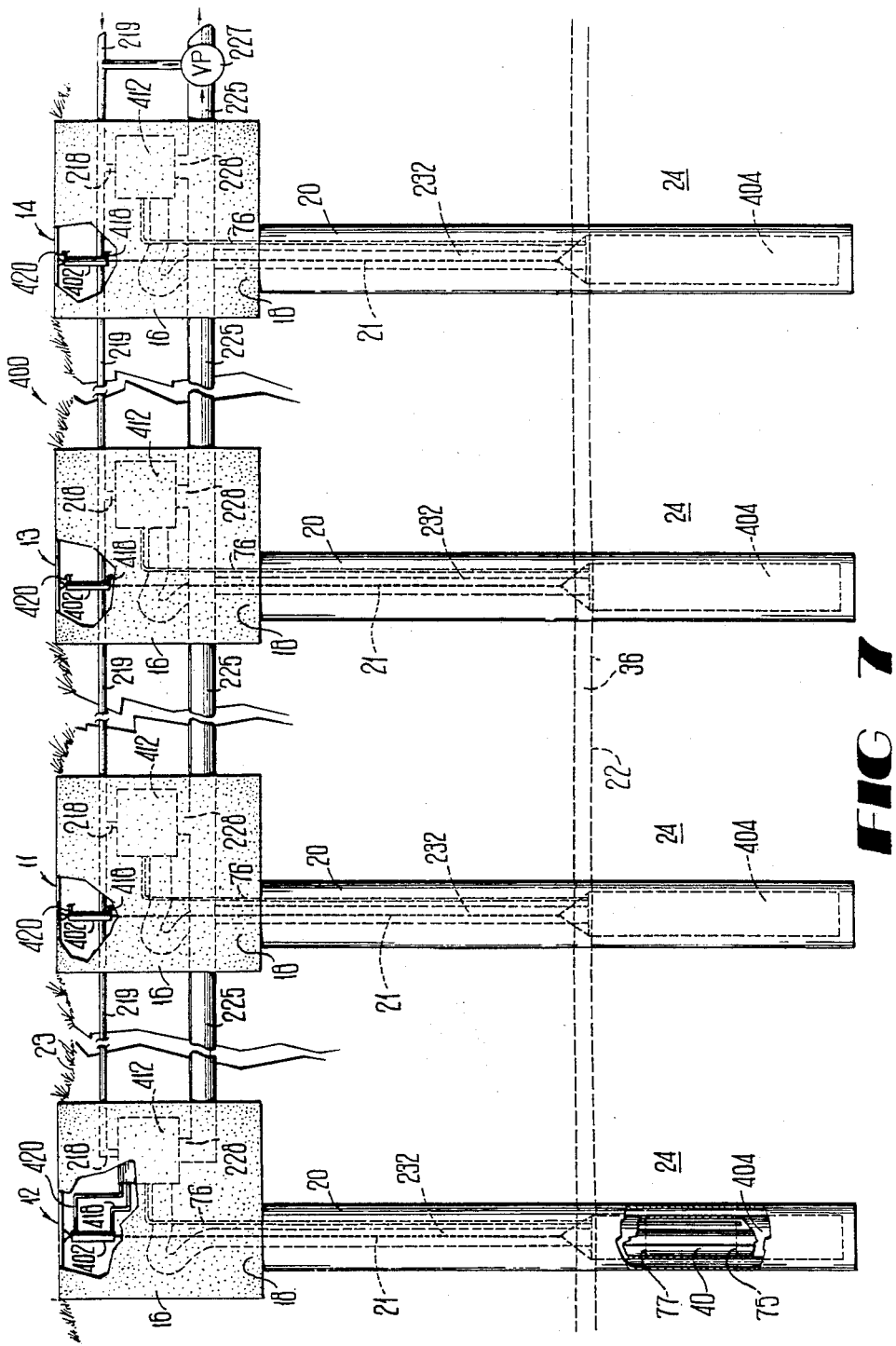
FIG. 7 is a schematic elevation view in cross-section of a third embodiment of the vacuum extraction system of the present invention.

Turning to FIG. 7, there is shown a vacuum extraction system 400. The vacuum extraction system 400 is in many respects the same as vacuum extraction system 10 shown in FIG. 1. Consequently, the same reference numerals in FIG. 1 will identify similar parts in FIG. 7. The vacuum extraction system 400 differs from vacuum extraction system 10 in two regards. First, the extraction vessels 404 differ from the extraction vessels 30 in that extraction vessels 404 do not have the metering valve 44 on the intake port 42. Instead, the intake port 42 is opened as much as possible for maximum intake of liquid. In addition, the vent port 46 and connecting pipe 49 have been removed from the extraction vessels 404 as compared to extraction vessels 30. Second, each of the extraction vessels 404 is suspended in the well bore by means of a cable 21 which is connected to a lift cylinder 402 at the well head. The lift cylinder 402 raises and lowers extraction vessel 404 and is controlled by controller 412 which is similar to controller 90.

Figure 8:
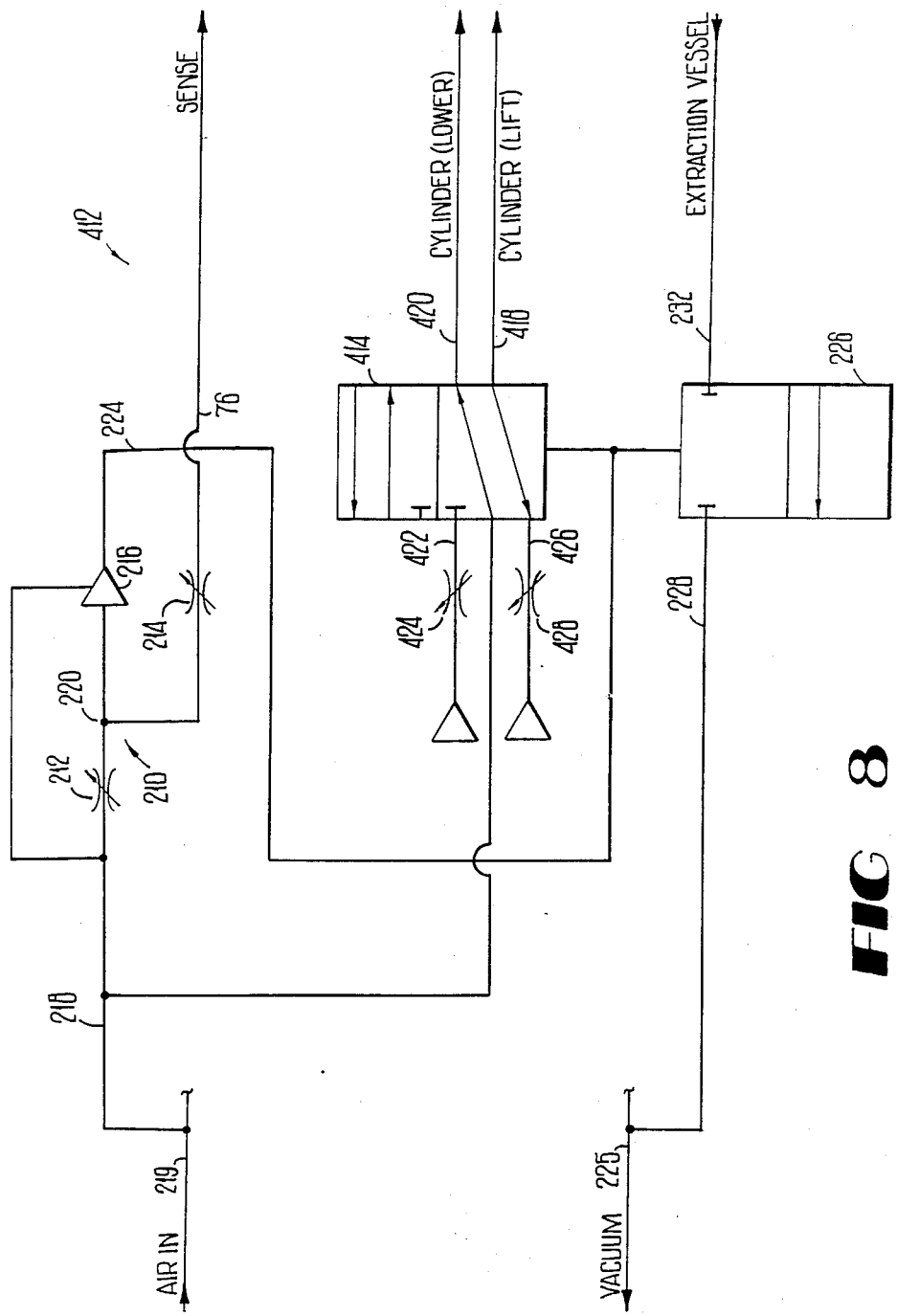
FIG. 8 is a schematic diagram of the air logic controller for the vacuum extraction system of FIG. 7.

Evacuation of liquid from the extraction vessel 404 and reciprocation of the lift cylinder 402 are controlled by controller 412 shown schematically in FIG. 8. Controller 412 is similar to controller 90 (FIG. 4) and reference numerals used in FIG. 4 for controller 90 will identify similar parts in FIG. 8 for controller 412. The controller 412 controls the connection and disconnection of the vacuum manifold to and from the outlet pipe 232 of extraction vessel 404 in response to the level of liquid in the vessel chamber 40. In addition, the controller 412 controls the raising and lowering of the lift cylinder 402.

With continuing reference to FIG. 8, the controller 412 is connected to the vacuum manifold 225 by means of vacuum input 228 and to a source of compressed air (line 219) by means of compressed air input 218. Controller 412 includes a sensing circuit 210 consisting of restrictors 212 and 214 and operational amplifier 216. The compressed air input 218 supplies compressed air to the sense circuit 210. The compressed air at input 218 passes through restrictor 212 to the input of operational amplifier 216 and through restrictor 214 to sense pipe 76 which terminates in the vessel chamber 40 of extraction vessel 404 (FIG. 7). As long as the liquid in vessel chamber 40 has not risen to upper level 77 (FIG. 7) on the sensor pipe 76, the back pressure created in the sensor pipe 76 and at node 220 is not sufficient to turn on operational amplifier 216. Once the liquid in the vessel chamber rises to the predetermined fill level 77, the back pressure created in sensor pipe 76 and node 220 is sufficient to turn on amplifier 216. When the operational amplifier 216 turns on, air pressure is produced at the amplifier's output 224 which causes two way normally closed valve 226 to connect vacuum input 228 from manifold 225 to vacuum outlet pipe 232 of extraction vessel 404. At the same time, the air pressure on line 224 operates four way normally closed valve 414 which connects compressed air on input 218 to output 418 in order to activate lift cylinder 402 upward. As the lift cylinder lifts in response to air pressure on line 418, air from the other side of the piston in the lift cylinder returns to the four way valve 414 via line 420 and is exhausted through line 422 and restrictor 424. The speed of the lift is controlled by exhausting the air through restrictor 424.

As the lift cylinder 402 raises the extraction vessel 404, the vacuum at vacuum manifold 225 continuously draws liquid from the vessel chamber 40, through pipe 50, through outlet port 48, through outlet pipe 232, through pipe 228, and into the vacuum manifold 225 until the liquid level in the vessel chamber drops to predetermined lower level 75. When the liquid reaches lower level 75, there is insufficient back pressure in sensor pipe 76 to keep the amplifier 216 on, and air pressure exhausts to atmosphere from the amplifier's output line 224. Consequently, normally closed valve 226 disconnects the outlet pipe 232 of the extraction vessel 404 from the vacuum manifold 225, and evacuation of the vessel chamber 40 ceases.

Simultaneously, the loss of air pressure from line 224 causes the four way valve 414 to change condition so that compressed air on line 218 is connected to the cylinder lower output line 420. As compressed air flows into the cylinder through line 420, air exits the cylinder on line 418 and is connected via the four way valve 414 to exhaust by way of line 426 and restrictor 428. The lowering speed of the cylinder is controlled by the setting of restrictor 428. As the extraction vessel 404 is slowly lowered into the liquid in the well bore, the open intake port 42 at the top of the extraction vessel 404 first allows the liquid hydrocarbons in layer 36 to weir into the vessel so that all of the liquid hydrocarbons in layer 36 are first collected in the extraction vessel before the intake 42 of the extraction vessel passes into the ground water below. Once the extraction vessel 404 has collected sufficient liquid hydrocarbons and ground water to reach the upper level 77, the process of lifting and evacuation repeats as previously described. Consequently, the vacuum extraction system 400 with extraction pump 404 and lift cylinder 402 operates to skim the liquid hydrocarbons in layer 36 off of the top of the well with each cycle.

Figure 9:
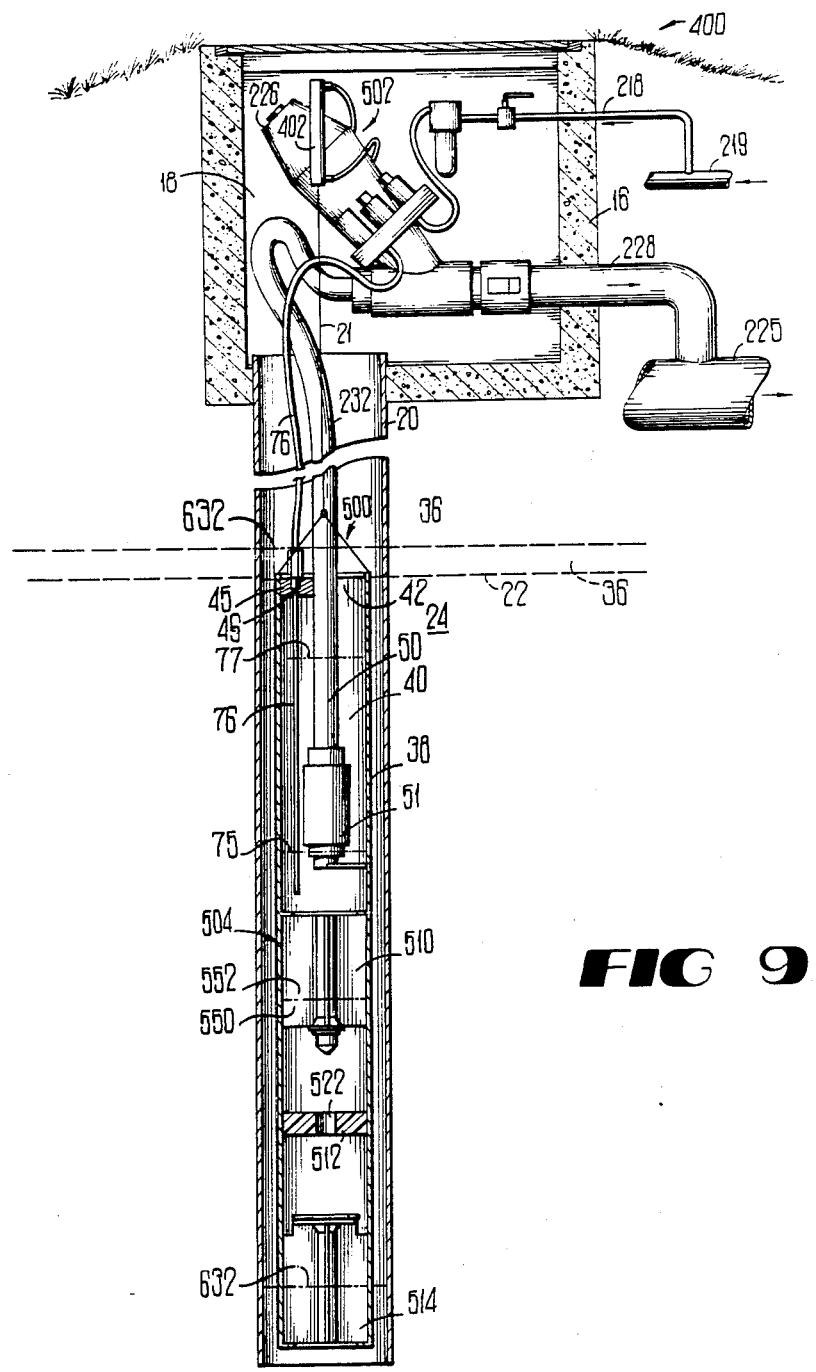
FIG. 9 is an enlarged schematic elevation view in cross-section of a fourth embodiment of the present invention showing an extraction vessel with a bottom differentiation valve.
Figure 10A:
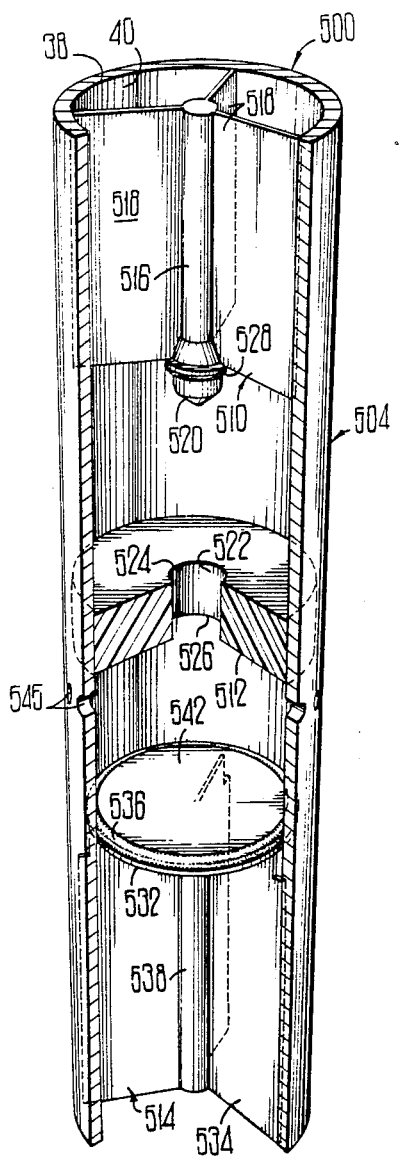
FIGS. 10A–10E are detailed cross-section views of the differentiation valve for the extraction vessel of the vacuum extraction system shown in FIG. 9.
Figure 10B:
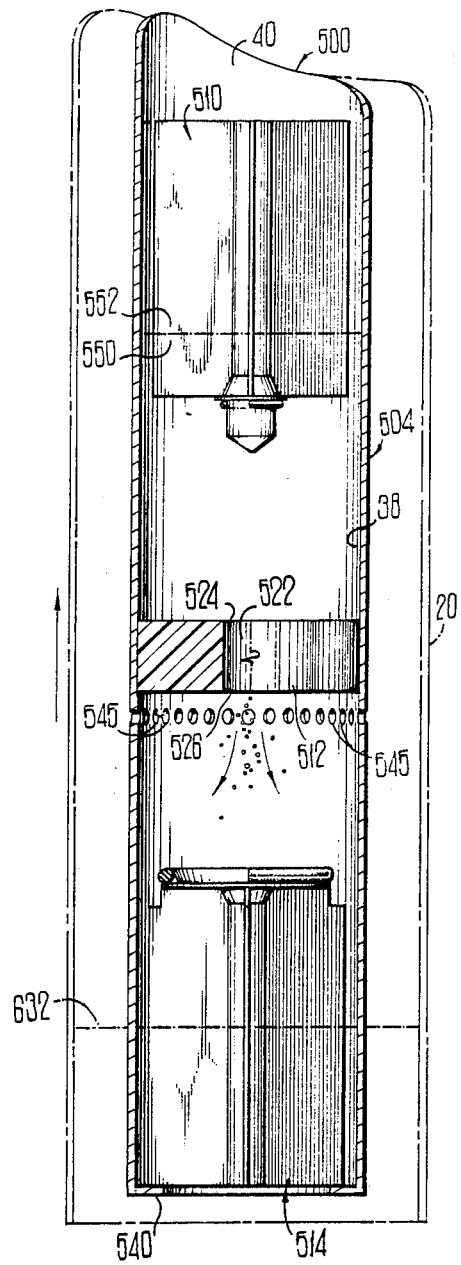
Figures 10C, 10D:
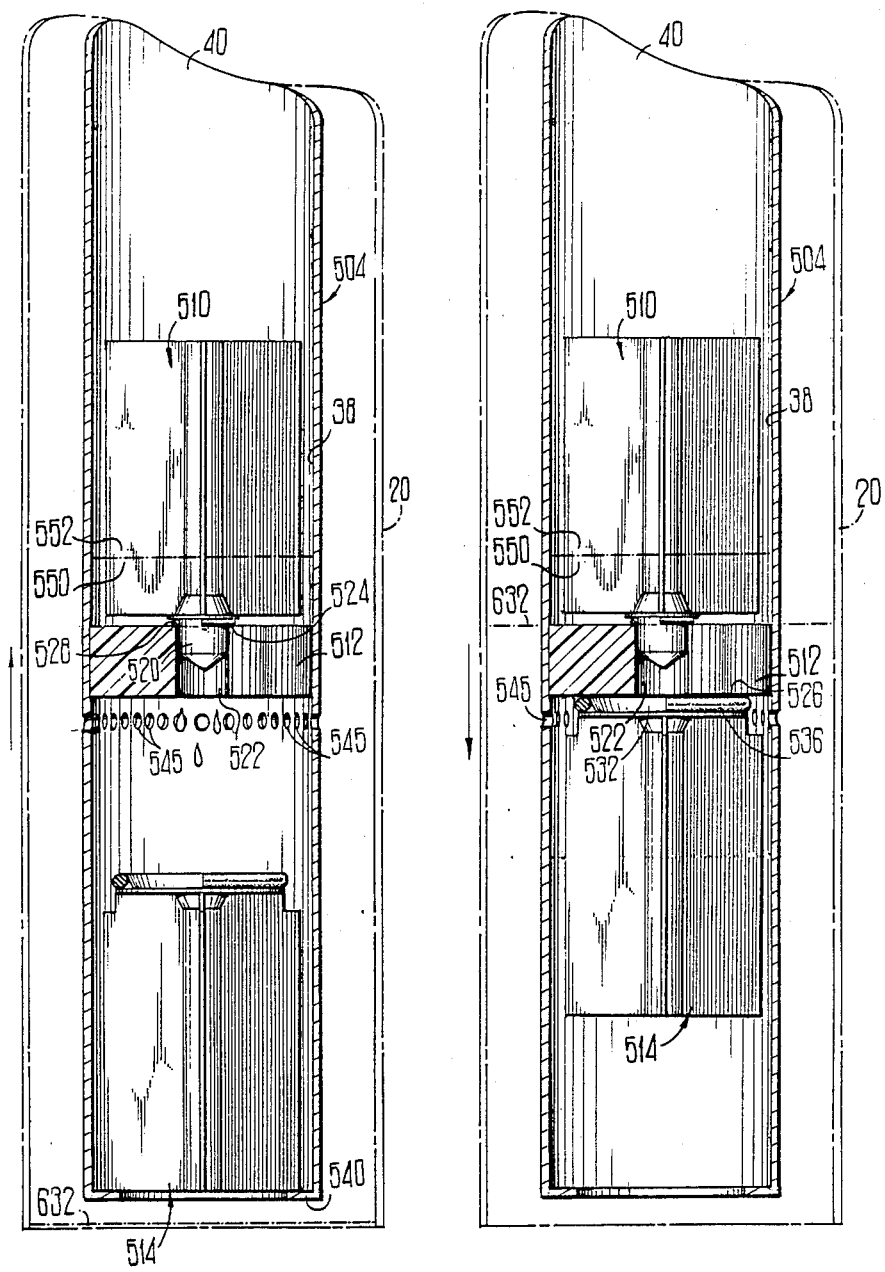
Figure 10E:
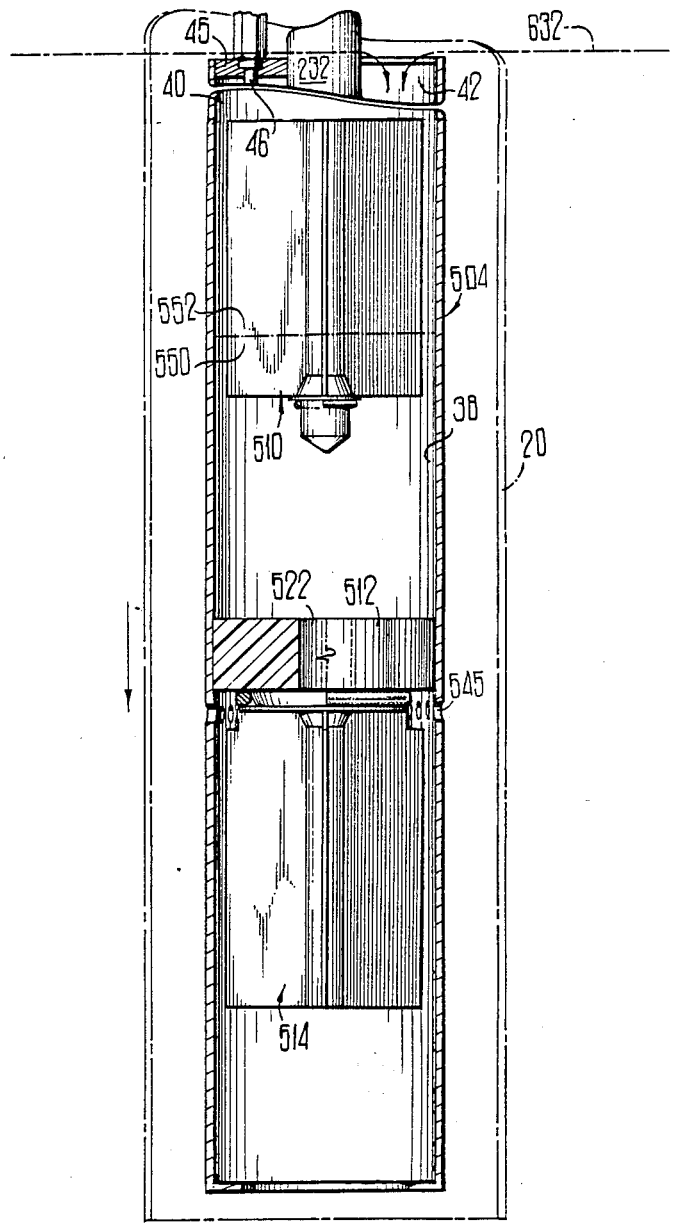
Figure 11:
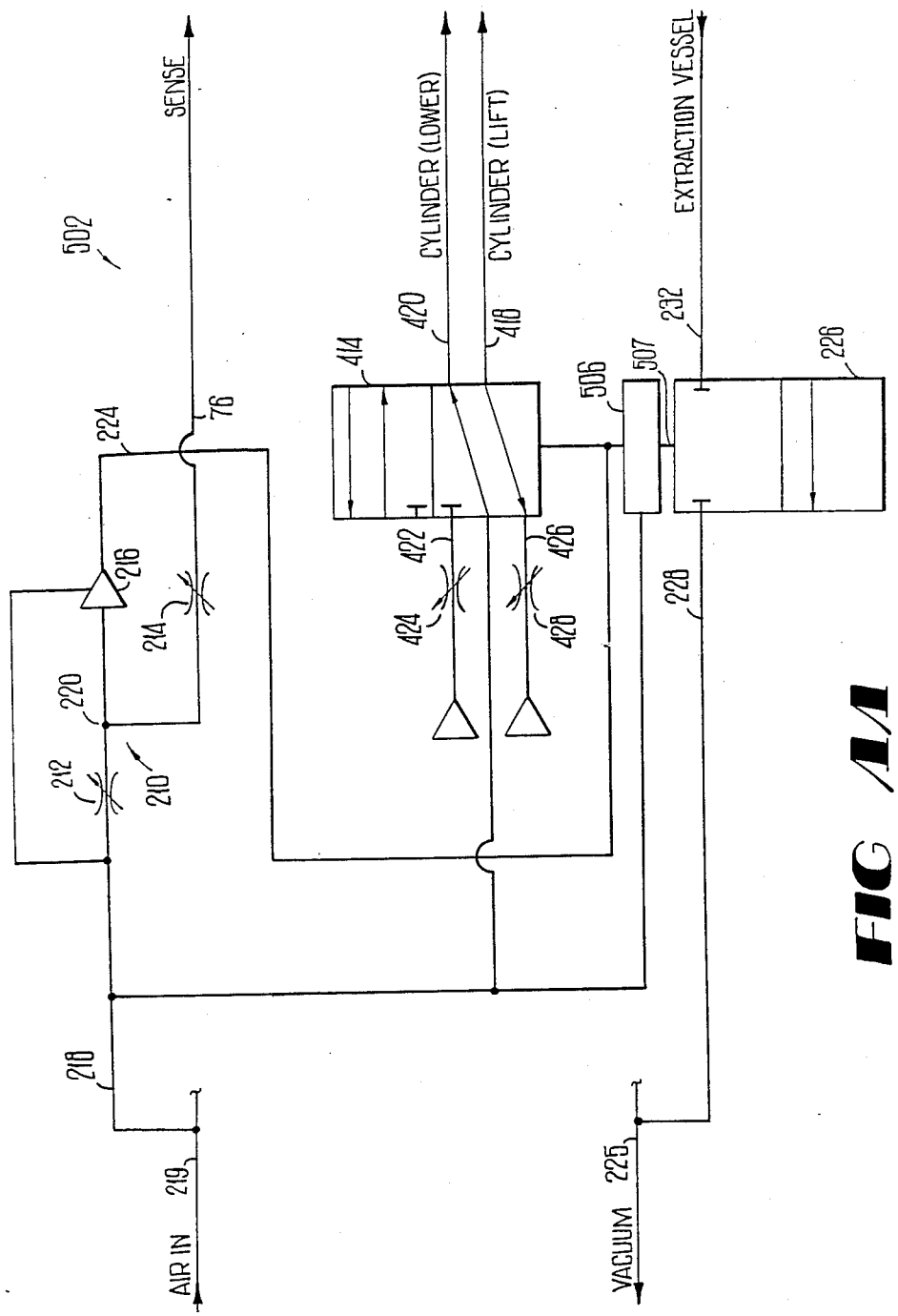
FIG. 11 is a schematic diagram showing the air logic controller used to control the vacuum extraction system of FIG. 9.

Turning to FIGS. 9–11, there is shown vacuum extraction system 400 which has a modified extraction vessel 500 and a modified controller 502. The extraction vessel 500 is similar to the previously described extraction vessel 404 except that the extraction vessel 500 has a differentiation valve 504 in the lower end of the vessel chamber 40 instead of the solid plug 47. The differentiation valve 504 releases ground water from the vessel chamber 40 while the extraction vessel 500 is being lifted by lift cylinder 402 and precludes the entry of ground water into the vessel chamber 40 while the extraction vessel is being lowered by cylinder 402. The controller 502 (FIG. 11) is similar to controller 412 except that it incorporates a time delay element 506 between the output 224 of the operational amplifier 216 and the two way normally closed valve 226 which connects the outlet pipe 232 to the vacuum manifold via line 228 for drawing the liquid in the vessel chamber to the surface. The time delay provided by delay element 506 (driven by compressed air on line 218) allows the differentiation valve 504 to release water from the vessel chamber 40 before vacuum evacuation of the vessel chamber begins.

With reference to FIG. 10A, there is shown a perspective view of the differentiation valve 504. FIGS. 10B, 10C, 10D, and 10E show the differentiation valve 504 in its various operating positions during the reciprocation and evacuation sequence of the extraction vessel 500. The differentiation valve 504 includes a top float element 510, a plug 512, and a bottom float element 514. The plug 512, is affixed and sealed to the side wall 38 of the extraction vessel 500. The plug 512 includes a center orifice 522 with a top opening seat 524 and a bottom opening seat 526.

The top float element 510 is disposed above the plug 512 and includes a stem 516 with a head 520 and radially extending vanes 518 which center the top floating element within cylindrical wall 38. A seal 528 is provided about the head 520 for engaging and sealing the top opening seat 524 of the plug 512.

The bottom float element 514 is disposed below the plug 512 and includes a stem 530, a head 532 and radially extending vanes 534 which center the bottom floating element within cylindrical wall 38. A seal 536 is provided around the head 532 which serves to seal the bottom opening seat 526 of the plug 512. A restrictor ring 540 is provided at the bottom end of the cylindrical wall 38 to retain the lower float element within the space between the ring 540 and the end plug 512. In addition, the head 532 has an area 542 which is slightly concave to insure that when the seal 536 engages the bottom of the plug 512 adjacent the bottom opening seat 526, there is a thin layer of liquid between the bottom of the plug 512 and the concave area 542. The area 542 is larger than the cross-section area of the head 520 of the top float element 510. Holes 545 are provided in the wall 38 below plug 512.

The top float element is made of any suitable material that is less dense than water and denser that the liquid hydrocarbons that are being collected by the extraction vessel. The bottom float element is simply less dense than water but not necessarily denser than the liquid hydrocarbons being collected by the extraction vessel.

FIGS. 10B through 10E show the sequence of operation of the extraction vessel 500 and particularly the differentiation valve 504. The sequence is controlled by controller 502 shown in FIG. 11. As previously indicated, controller 502 is similar to controller 412 except that it has the additional time delay element 506 interposed in line 224 between the operational amplifier 216 and the two way normally closed valve 226. The time delay element 506 provides air pressure on its output 507 to two way normally closed valve 226 after the predetermined time delay has expired and as long as the signal on line 224 remains. If, however, during the predetermined time delay, the air pressure on line 224 disappears, then the two way normally closed valve 226 will not be activated. The next time air pressure appears on line 224 and lasts for greater than the period of the time delay then valve 226 will be opened.

The sequence of operation then proceeds as follows. Initially, the vessel chamber 40 is lowered until it is filled with liquid hydrocarbons and water to the upper level 77 which as previously described causes the operational amplifier 216 to produce air pressure on its output 224. The air pressure is connected to four way valve 414 which causes the cylinder to begin lifting the extraction vessel in the well bore. As the extraction vessel 500 is raised in the well casing, the liquid level 632 in the well casing and the differentiation valve 504 are in the position shown in FIG. 10B. As can be seen, the vessel chamber 40 is filled with a lower layer of ground water 550 and an overlying upper layer of liquid hydrocarbons 552. Because the top float element 510 floats in the water, it has floated above the plug 512 thereby opening the top opening seat 524 of the orifice 522. The differential pressure of the water in the layer 550 has overcome the hydraulic pressure below the lower float element 514, and the lower float element 514 has unseated from the bottom opening seat 526 and sunk with the casing liquid (level 632) to the position shown in FIG. 10B. Opening of the bottom opening seat 526 allows the water in the layer 550 to escape through the orifice 522 and out of the bottom of the extraction vessel 500 through holes 545.

While the water is escaping through the differentiation valve as shown in FIG. 10B, the delay element 506 (FIG. 11) continues timing out. As a result, during the delay time, two way normally closed valve 226 has not connected the outlet of the extraction vessel to the vacuum manifold, and therefore no liquid is being withdrawn from the vessel chamber.

As the extraction vessel is lifted to the position shown in FIG. 10C, the water in layer 550 is completely released from the vessel chamber 40. Because the top float element 510 is heavier than the liquid hydrocarbons in layer 552, the top float elements 510 sinks into contact with the plug 512, and the head 520 and seal 528 close off the top opening seat 524 of the orifice 522 so that liquid hydrocarbons cannot escape from the vessel chamber.

If the release of the water from the vessel chamber causes the liquid hydrocarbons in the vessel chamber to drop below the lower level 75 in the vessel chamber, before the expiration of the time delay, the operational amplifier 216 will be turned off and none of the liquid in the vessel will be evacuated to the surface by the vacuum pump. Alternatively, if the level of the liquid in the vessel chamber does not drop below the lower level 75 and the time delay expires, the delay element 506 will produce air pressure on its output 507 to drive valve 226, and the valve 226 will connect the outlet of the extraction vessel to the vacuum manifold. Evacuation of liquid from the vessel chamber will continue until the liquid level drops below the lower level 75 at which time the air pressure output of the operational amplifier 216 will disappear thereby disconnecting the vacuum manifold from the output of the extraction vessel. The loss of air pressure on line 224 will also cause the four way valve 414 to start the slow decent of the extraction vessel back into the liquid in the well casing (level 632).

As the extraction vessel is lowered into the liquid in the well casing (level 632) in FIG. 10D, there is only a thin layer of water initially inside the vessel chamber 40, and the liquid in the well bore causes the bottom float element 514 to float up and into contact with the bottom opening seat 526 of the plug 512. Because the head 532 is large, sufficient pressure can be created on the bottom side of the head to push the seal 536 into engagement with the bottom of the plug 512. The concave area 542, however, retains a layer of liquid between the bottom of the plug and the top of the head of the bottom float element 514. The layer of liquid in the concave area 542 provides a hydraulic passage through orifice 522 and assures that the bottom float element 514 will readily unseal from the bottom of the plug 512 when the extraction pump is again lifted from the liquid in the well.

During the initial decent of the extraction vessel (FIG. 10D), there is virtually no water inside the vessel chamber, therefore, the top float element 510 remains in contact with the top of the plug 512. As the intake port 42 of the extraction vessel 500 passes through the liquid hydrocarbons in layer 36 (FIG. 9) and into the ground water below, water begins to build up inside the vessel chamber 40 causing the top float element 510 to float up and out of engagement with the top of the plug 512 (FIG. 10E). Because the bottom float element 514 floats in water, the water above the plug 512 has no affect on its operation and it continues in contact with the bottom of the plug 512 so that ground water cannot flow into the vessel chamber 40 through the orifice 522 while the extraction vessel 500 is descending and intaking liquid hydrocarbons and water through top intake port 42.

Once the vessel chamber 40 has filled through the top intake port 42 to the upper level 77, the operational amplifier 216 (FIG. 11) produces air pressure at its output line 224 which activates the lift cylinder 402 and thus begins the sequence again as shown in FIG. 10B.

I claim:

1. A vacuum extraction system for recovery of liquid hydrocarbons from ground water comprising:
   (a) a well bore with liquid hydrocarbons and ground water therein;
   (b) an extraction vessel suspended in the bore comprising:
      i. a top, a bottom and sides defining a vessel chamber;
      ii. a top intake port with an adjustable metering valve;
      iii. a vent pipe in the top which extends above a pump to a position above the water and liquid hydrocarbons in the bore; and
      iv. an outlet port in the top which communicates with the vessel chamber adjacent the bottom via an outlet pipe;
   (c) a vacuum pump;
   (d) a level sensor for detecting the level of liquid in the vessel chamber; and
   (e) controller means interconnecting the outlet port of the extraction vessel and the vacuum pump for selectively connecting and disconnecting the vacuum pump to and from the outlet port in response to the level sensor detecting the level of liquid in the vessel chamber.

2. The vacuum extraction system of claim 1, wherein the controller means further includes a pump controller means for selectively activating and deactivating the vacuum pump when vacuum pump is respectively connected to and disconnected from the outlet port of the extraction vessel.

3. A vacuum extraction system for recovery of liquid hydrocarbons from ground water comprising:
   (a) a number of well bores each with liquid hydrocarbons and ground water therein;
   (b) an extraction vessel suspended in each bore comprising:
      i. a top, a bottom and sides defining a vessel chamber;
      ii. a top intake port with an adjustable metering valve;
      iii. a vent pipe in the top which extends above the pump to a position above the water and liquid hydrocarbons in the bore; and
      iv. an outlet port in the top which communicates with the vessel chamber adjacent the bottom via an outlet pipe;
   (c) a manifold connected to a vacuum pump;
   (d) a level sensor associated with each extraction vessel for detecting the level of liquid in the vessel chamber; and
   (e) controller means associated with each extraction vessel interconnecting the outlet port of the extraction vessel and the manifold for selectively connecting and disconnecting the manifold to and from the outlet port in response to the level sensor detecting the level of liquid in the vessel chamber.

4. The vacuum extraction system of claim 3, wherein each controller means further includes a pump controller means which in response to the controller means connecting the manifold to the outlet port of the extraction vessel generates a pump control signal and wherein the pump control signals from each controller are connected to a valve means for activating the vacuum pump when any pump control signal is present and deactivating the vacuum pump when no pump control signal is present.

5. A vacuum extraction system for recovery of liquid hydrocarbons from ground water comprising:
   (a) a well bore with liquid hydrocarbons and ground water therein;
   (b) an extraction vessel suspended by means of a lift cylinder in the bore comprising:
      i. a top, a bottom and sides defining a vessel chamber;
      ii. a top intake port;
      iii. an outlet port in the top which communicates with the vessel chamber adjacent the bottom via an outlet pipe;
   (c) a vacuum pump;
   (d) a level sensor for detecting the level of liquid in the vessel chamber; and
   (e) controller means interconnecting the outlet port of the extraction vessel, the vacuum pump and the lift cylinder for selectively connecting the vacuum pump to the outlet port and activating the lift cylinder to lift the extraction vessel in response to the level sensor detecting that the level of liquid in the vessel chamber has reached a predetermined upper level and disconnecting the vacuum pump from the outlet port and deactivating the lift cylinder to lower the extraction vessel in response to the level sensor detecting the level of liquid in the vessel chamber has reached a predetermined lower level.

6. The vacuum extraction system of claim 5, wherein the extraction vessel includes a differentiation valve in the lower end of the vessel chamber that will allow the release of water and inhibit the release of liquid hydrocarbons while the extraction vessel is being raised and which will inhibit inflow of water while the extraction vessel is being lowered and wherein the controller further includes a delay for delaying the selective connection of the vacuum pump to the outlet port to allow time for release of water through the differentiation valve.

7. The vacuum extraction system of claim 6, wherein the differentiation valve comprises a plug with an orifice therethrough, an upper float element above the plug for sealing the orifice, which upper float element will float in water but will sink in the liquid hydrocarbons, and a lower float element below the plug for sealing the orifice, which lower float element will float in water.

8. The vacuum extraction system of claim 7, wherein the lower float element has a concave sealing area adjacent the orifice in the plug.

9. The vacuum extraction system of claim 8, wherein the upper float element has a sealing area that is smaller than the concave sealing area of the lower float element.

10. The vacuum extraction system of claim 5, wherein the controller means further includes a pump controller means for selectively activating and deactivating the vacuum pump when the vacuum pump is respectively connected to and disconnected from the outlet port of the extraction vessel.

11. A vacuum extraction system for recovery of liquid hydrocarbons from ground water comprising:
    (a) a number of well bores each with liquid hydrocarbons and ground water therein;
    (b) an extraction vessel suspended by means of a lift cylinder in each bore comprising:
        i. a top, a bottom and sides defining a vessel chamber;
        ii. a top intake port;
        iii. an outlet port in the top which communicates with the vessel chamber adjacent the bottom via an outlet pipe;
    (c) a manifold connected to a vacuum pump;
    (d) a level sensor associated with each extraction vessel for detecting the level of liquid in the vessel chamber; and
    (e) controller means associated with each extraction vessel interconnecting the outlet port of the extraction vessel, the manifold, and the lift cylinder for selectively connecting the manifold to the outlet port of the extraction vessel and activating the lift cylinder to lift the extraction vessel in response to the level sensor detecting that the level of liquid in the vessel chamber has reached a predetermined upper level and disconnecting the manifold from the outlet port and deactivating the lift cylinder to lower the extraction vessel in response to the level sensor detecting the level of liquid in the vessel chamber has reached a predetermined lower level.

12. The vacuum extraction system of claim 11, wherein the extraction vesel includes a differentiation valve in the lower end of the vessel chamber that will allow the release of water and inhibit the release of liquid hydrocarbons while the extraction vessel is being raised and which will inhibit inflow of water while the extraction vessel is being lowered and wherein the controller further includes a delay for delaying the selective connection of the manifold to the outlet port to allow time for release of water through the differentiation valve.

13. The vacuum extraction system of claim 12, wherein the differentiation valve comprises a plug with an orifice therethrough, an upper float element above the plug for sealing the orifice, which upper float element will float in water but will sink in the liquid hydrocarbons, and a lower float element below the plug for sealing the orifice, which lower float element will float in water.

14. The vacuum extraction system of claim 13, wherein the lower float element has a concave sealing area adjacent the orifice in the plug.

15. The vacuum extraction system of claim 14, wherein the upper float element has a sealing area that is smaller than the concave sealing area of the lower float element.

16. The vacuum extraction system of claim 11, wherein the controller means further includes a pump controller means for selectively activating and deactivating the vacuum pump when the manifold is respectively connected to and disconnected from the outlet port of the extraction vessel.

* * * * *